No. 663,190. Patented Dec. 4, 1900.
T. N. THOMSON.
EGG HOLDER.
(Application filed Mar. 3, 1899.)

(No Model.)

WITNESSES
R. H. Newman
O. G. Moran

INVENTOR
Thomas N. Thomson
BY
L. B. Replogle
ATTORNEY

THE NORRIS PETERS CO., PHOTO-LITHO., WASHINGTON, D. C.

UNITED STATES PATENT OFFICE.

THOMAS N. THOMSON, OF SCRANTON, PENNSYLVANIA, ASSIGNOR TO D. B. REPLOGLE, OF SAME PLACE.

EGG-HOLDER.

SPECIFICATION forming part of Letters Patent No. 663,190, dated December 4, 1900.

Application filed March 3, 1899. Serial No. 707,630. (No model.)

*To all whom it may concern:*

Be it known that I, THOMAS N. THOMSON, a citizen of the United States, residing at Scranton, in the county of Lackawanna and State of Pennsylvania, have invented certain new and useful Improvements in Egg-Holders, of which the following is a specification.

The invention relates to egg-holders such as are adapted to hold each egg separately during shipment or handling for the purpose of preventing breakage.

The objects of the invention are to furnish a simplified egg-holder, to provide suitable advertising-space on such egg-holder, and to adapt it as a suitable delivering-case for eggs, as well as a suitable receptacle for containing the eggs in the pantry or other cooking-apartments, and other objects, as will appear in the specification.

Figure 1:
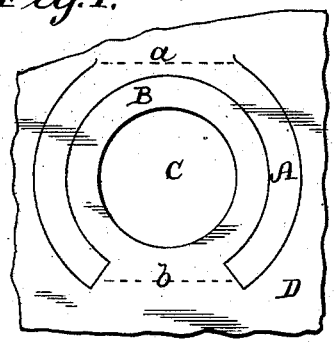
Figure 2:
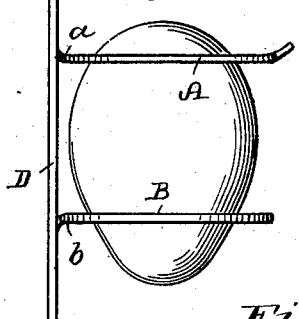
Figure 3:
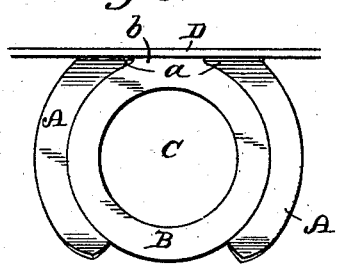
Figure 4:
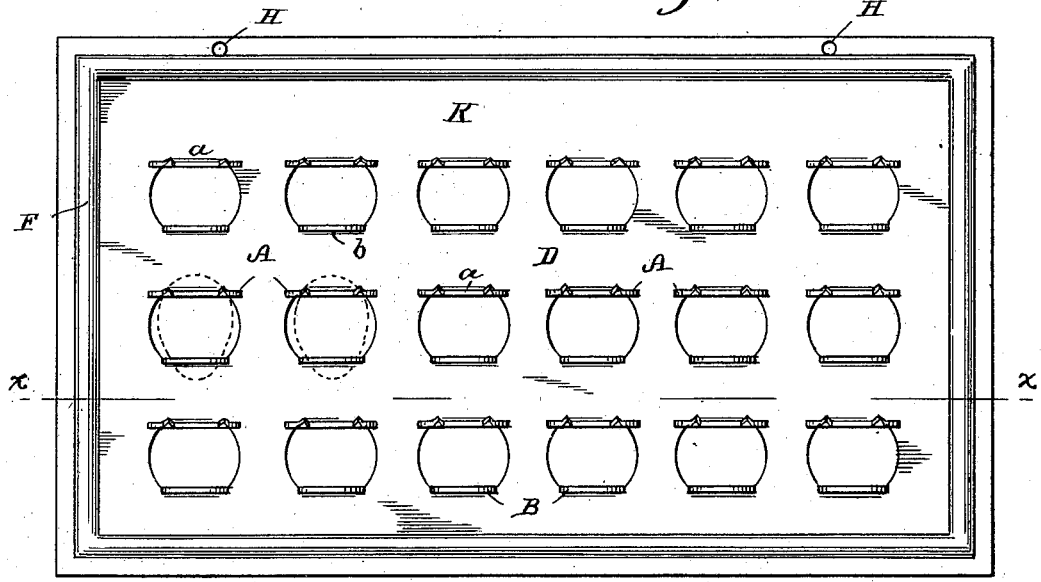
Figure 5:
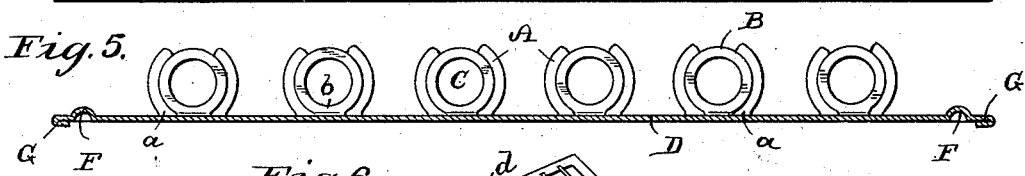
Figure 6:
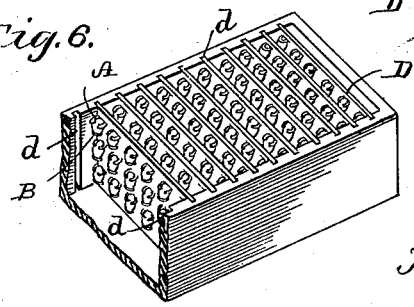

In the drawings accompanying this specification, Figure 1 is a diagrammatic view showing the method of cutting the plate metal preliminary to bending it in shape to form an individual egg-receptacle. Fig. 2 is a side elevation of a single egg-receptacle, showing an egg in position. Fig. 3 is a top view of the same receptacle shown in Fig. 2 with the egg removed. Fig. 4 is a plan view of one of my egg-holders complete. Fig. 5 is a cross-section taken on the line $x\,x$ of Fig. 4. Fig. 6 is a view showing how my holders when filled with eggs may be placed into a common receptacle for delivery or shipment.

In the drawings, A designates the upper supporting members of a single receptacle, which are cut on curved lines from the metal D and bent at $a$ to the perpendicular position shown in Fig. 2. B designates the lower supporting member, which is bent downward, making an angle at $b$. The member B has a circular opening C through its center, the metal from which does not enter into the construction of my device; but it should be noted that the piece of metal cut from the opening C is the only waste consequent upon the manufacture of my device. In addition to bending the members A to the perpendicular plane, as shown in Fig. 2, they are also pressed toward one another, so as to clasp the egg more securely after it has been pressed between them. Any number of these individual holders may be cut from a single plate, as shown in Fig. 4, and a bead F and swage G may be used to strengthen the article. On some suitable part—as, for example, in the space K—the dealer may have his advertisement printed. The device is also provided with eyelets H H, by means of which it may be hung upon the wall, where ready access may be had to its contents. When eggs are to be delivered in my egg-holders, a suitable box, as shown in Fig. 6, should be provided, having parallel ways $d\,d$, into which the separate holders may be slid at suitable distances.

The device may be used as follows. It may be shipped to the consumer before the members A and B are bent into position, in which condition the holders will nest with one another and take up comparatively little space. Wholesale dealers may also print their customers advertisements on the advertisement-space previous to delivery or it may be printed on afterward; but it is best to have it printed before the members of the individual egg-holders are bent into position. Inserting the egg is accomplished by placing the small end within the opening C and pushing the large end directly toward the plane of the metal D until the members A A clasp the upper portions of the egg. Removing the egg is simply an inverse operation to that just described.

I do not wish to be confined to the exact construction shown in the drawings, as it is evident that many of the details may be varied without departing from the general spirit of my invention. For example, the egg-holding members may be swaged or bent, so that the flat sides of the metal conform to the surface of the egg. The ends of the members A may also be cut round instead of square, as shown, and the arrangement of the several egg-holding members in the aggregation may be varied, according to the economy or fancy of the manufacturer.

What I do claim, and desire to secure by Letters Patent, is—

1. An egg-holder constructed from a single piece of metal, the said metal being cut by wholly circular and part circular lines parallel each to each forming opposing retaining members having free ends adapted to clasp an egg substantially as specified.

2. An egg-holder constructed from plate metal by cutting curved members A A and bending them into a plane perpendicular with the plate from which they are cut and bending, from the opening made by them, the member B having a substantially circular opening C cut therethrough, and the said member B bent so as to occupy a plane substantially parallel to that occupied by the members A A for the purpose set forth.

In testimony whereof I affix my signature in presence of two witnesses.

THOMAS N. THOMSON.

Witnesses:
D. G. MORAN,
ALBERT BALL.